June 28, 1927. Re. 16,664

L. S. GILMORE

TOURIST'S KITCHENETTE OR CABINET

Original Filed Sept. 16, 1922

INVENTOR.
LOU SHIELDS GILMORE

BY B. J. Craig

ATTORNEY.

Reissued June 28, 1927. Re. 16,664

UNITED STATES PATENT OFFICE.

LOU SHIELDS GILMORE, OF LOS ANGELES, CALIFORNIA, ASSIGNOR, BY MESNE ASSIGNMENTS, TO TOURIST SUPPLY COMPANY, OF LOS ANGELES, CALIFORNIA, A CORPORATION OF DELAWARE.

TOURIST'S KITCHENETTE OR CABINET.

Original No. 1,502,096, dated July 22, 1924, Serial No. 588,596, filed September 16, 1922. Application for reissue filed January 19, 1925. Serial No. 3,508.

This invention relates to portable kitchenettes or cabinets which are adapted for use in light housekeeping.

The general object of the invention is to provide an improved cabinet which is adapted to be removably secured upon the running board of an automobile and which while of simple and economical construction, nevertheless serves to provide means for housing a large assortment of foodstuffs, together with means for refrigerating a portion of said foodstuffs.

One of the specific objects of the invention is to provide an improved running board cabinet having a drinking water compartment therein together with improved means for refrigerating the drinking water.

Another object of the invention is to provide a movable kitchenette wherein an ice compartment is provided and wherein a drinking water compartment is associated with the ice compartment and with a container for receiving the drip, the whole providing means for maintaining the drinking water cool for long periods of time.

A further object of the invention is to provide an improved kitchenette wherein a hinged top closure and a hinged front closure are provided for upwardly opening and forwardly opening compartments and wherein the two closures interlock when they are in closed position.

Another object of the invention is to provide a kitchenette having forwardly opening compartments and closures therefor and wherein a large closure serves to close the front of the kitchenette and to hold said first mentioned closures in position.

Figure 1:
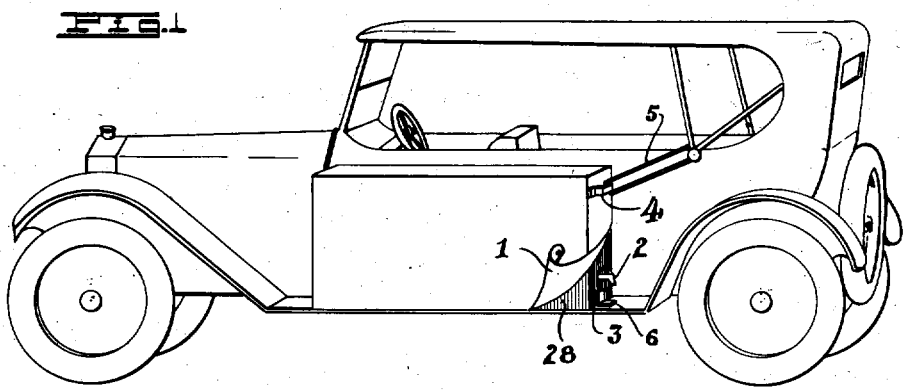
Figure 3:
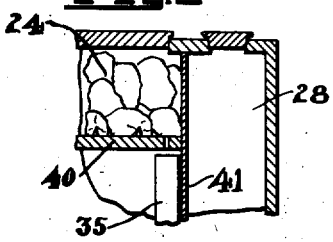
Figure 2:
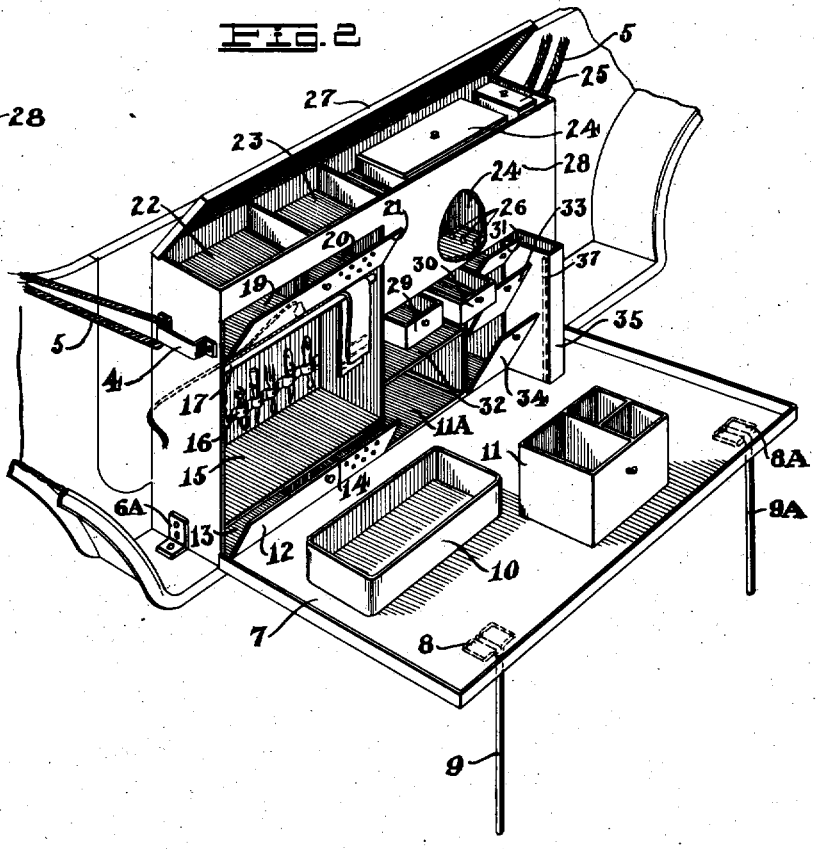

Other objects of the invention will be apparent from the following description taken in connection with the accompanying drawings wherein Fig. 1 is a side view of a motor vehicle with my device applied thereto; Fig. 2 is a perspective view of the device showing the same in open position and Fig. 3 is a sectional detail of the drinking water compartment, with portions broken away.

Referring to Fig. 1, I show a tourist's kitchenette or cabinet which is preferably made of metal mounted on the running board of an automobile. A canopy 1 is drawn over the kitchenette. The corner of the canopy is rolled back showing a faucet 2 opening out of a drinking water compartment 28. A handle 4 is arranged at each end of the cabinet and a canvas strap 5 may pass through the handle to fasten the kitchenette to the automobile.

A bolted cleat or bracket 6 may also be used to securely fasten the kitchenette or cabinet removably upon the running board of the automobile. The canopy 1 is removable and while the kitchenette or cabinet is "in camp" can be suspended above the cabinet and table to afford shade and for protection from the elements.

In Fig. 2 the cabinet is shown with the top or upper lid 27 elevated and with the door or lower lid 7 lowered and resting on detachable legs 9 and $9^A$ which are inserted in loops formed in cleats 8 and $8^A$ secured to the outer surface of the door 7.

The door 7 when opened forms a work-table and dining table. A rectangular shaped dish-pan having round corners is shown at 10, this pan when packed, is fitted in a compartment 15 which may house other cooking utensils and may have a rod or rack 17 near the upper front portion of said compartment, on which to hang damp or used towels, dish-towels and cloths. A looped strap 16 in which to insert pieces of cutlery may also be provided in the compartment and suitable wires may be arranged to receive electric current from an automobile to light an electric bulb which may illuminate the work table or dining table.

A compartment 19 may be provided for plates and pans while another compartment 20 may serve as a receptacle for bread. A lid 21 closes both compartments and the portion of the lid in front of the bread compartment 20 is preferably perforated for ventilation. Face and bath towels may be arranged in the compartment 22 and tea towels may be placed in the compartment 23.

A lid 24 which is made of heat insulated material may be provided for the ice compartment while a second heat insulated lid 25 may be used on the drinking water compartment. The lid 27 when closed fits down over the top of the compartments 22 and 23 and also fits over the lids 24 and 25. A dead air space is provided however, between the top of the insulation of the ice chest and the adjacent water tank to maintain the proper refrigeration.

The bottom of the ice chest is provided with a plurality of spurs or pins 26 which prevent movement of the ice when the automobile is in motion.

In addition to the compartments previously described, I provide a drawer 29 which may serve for silverware, a drawer 30 which may receive bacon and a compartment 31 in which egg cartons may be placed if desired. The compartments 29 and 30 as shown in Fig. 2 are sliding drawers, while the compartment 31 is provided with a hinged lid.

An open ended compartment 32 which has no individual cover may serve as a storage space for books and magazines. A sliding drawer 11 may be provided with a plurality of compartments which may contain flour, sugar, and meal and this drawer may be slid into the compartment 11[A] when desired.

A compartment may be provided for fruit which may be closed by a hinged lid 33 as shown while another compartment 34 may be used as a storage place for coffee, butter and shortening.

In order that the full refrigerating capacity of the ice may be utilized, I provide a drip container 35 which fits beneath the discharge aperture in the ice chest and receives the drip from the melting ice. This container 35 is provided with an overflow pipe 37. This overflow pipe is closed except at its upper and lower ends, and the lower end projects through the bottom of the container 35. As will be apparent, the drops of water from the melting ice will pass into the container 35 and there will be no discharge from this container until the top of the pipe 37 is reached.

Each of the containers and closures may be provided with a handle ring thereon to facilitate the opening thereof.

In Fig. 3 a portion of the drinking water compartment, the ice chest and a part of the drip container are shown. The insulation for these parts is shown by cross sectioning as at 40 and this is applied to the ice compartment and the drinking water compartment as shown.

An uninsulated division 41 is provided between the drinking water compartment and the ice compartment and between the drinking compartment and the drip container 35. From this construction it is apparent that the ice in the ice chest will refrigerate the water in the compartment 28 and a mild refrigeration will be obtained from the drip container 35.

In using my invention the canopy 1 is first removed, the lid 27 is then raised, thus allowing the table 7 to be moved to operative position. The legs 9 are then properly positioned after which the lid 27 may be closed as described. In breaking camp the door 7 is first closed with its flanges fitting over the top of the sides of the container of the kitchenette. After this is done, the lid 27 is closed thus locking the door 7 in place. After this is done, the canopy may be replaced.

From the foregoing description it will be apparent that I have provided a kitchenette which is compact, which can be economically manufactured and which is not likely to get out of order.

Having thus described my invention, I claim:

1. A device of the character stated comprising a casing, a closure at the front, a multiplicity of compartments accessible when said closure is open, a hinged top and compartments accessible when said top is opened, said compartments including an ice receptacle and a drinking-water container, a series of compartments intermediate the front and top compartments, and an independent closure therefor, said last named closure being in position to be concealed by the first named closure when closed.

2. A device of the character stated comprising a casing having an open front, a closure to cover said entire front, a multiplicity of compartments accessible when said closure is opened, drawers in certain of said compartments, the upper portion of said casing comprising an ice chest and an adjacent liquid container, a separate closure for the upper part of said casing, means whereby ice in said chest refrigerates some of said compartments, said refrigeration occurring without air circulation whereby odoriferous foods may be stored in the ice compartment without contaminating articles refrigerated in the other compartments, said second closure engaging said first closure to hold the first closure in closed position.

In testimony whereof, I hereunto affix my signature.

LOU SHIELDS GILMORE.